June 24, 1924.
R. G. OLD ET AL
1,499,248
VALVE FOR PNEUMATIC TIRES AND FOR LIKE PURPOSES
Filed July 10, 1922
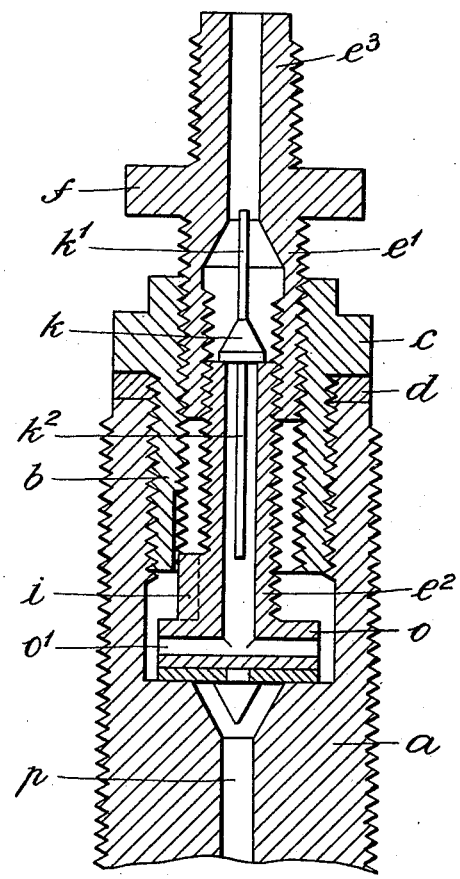
Inventors
R. G. Old and
F. W. Hill
by Wilkinson & Fiusta
Attorneys.

Patented June 24, 1924.

1,499,248

UNITED STATES PATENT OFFICE.

ROY G. OLD AND FREDERICK WILLIAM HILL, OF FOLKESTONE, ENGLAND.

VALVE FOR PNEUMATIC TIRES AND FOR LIKE PURPOSES.

Application filed July 10, 1922. Serial No. 574,119.

*To all whom it may concern:*

Be it known that we, ROY GARNETT OLD, motor engineer, residing at 37 Limes Road, Folkestone, in the county of Kent, England, and FREDERICK WILLIAM HILL, engineer, residing at 138 Dover Road, Folkestone, in the county of Kent, England, both subjects of the King of Great Britain, have invented a new and useful Improvement in Valves for Pneumatic Tires and for Like Purposes, of which the following is a specification.

This invention has for its object to provide an improved construction of valve for pneumatic tires, and for like purposes.

According to this invention there is provided in combination with an outer valve tube, an inner tubular stem fitted with a non-return valve and provided with a valve head at its inner end, the arrangement being such that the inner tubular stem, or an inner member forming part thereof is screwed back and forth for the purpose of opening and closing the air passage in the outer tube by said valve head, and the non-return valve holds the air pressure during inflation.

The said valve head on the tubular stem may be of any suitable kind such as a disc valve, or a coned rubber plug valve.

If required all the valve may be of metal so as to do away with all rubber parts.

The accompanying drawings show one construction of the improved valve.

The figure is a vertical section of the improved device.

In the construction shown, the inner tubular stem is divided into two members consisting of an outer member $e'$ screwing on to an inner member $e^2$, which is held against rotation in regard to the sleeve $b$ into which the outer member $e'$ is screwed by a reverse thread, the said sleeve $b$ being in turn screwed into the air tube stem $a$. The outer member $e'$ of the divided inner tubular stem is formed with an operating flange $f$ on the outer side of which is disposed a screwed part $e^3$ for receiving the inflator nozzle, whilst on the inner side of the flange $f$, the said member is screwed with a left hand thread so as to be screwed back and forth in the outer sleeve $b$ when rotated together with the inflator nozzle. The inner member $e^2$ of the tubular stem is screwed by a right hand thread into the outer member $e'$ and is made of such length that at the end of its movement space is left in the central passage to form a chamber for a non-return valve $k$ consisting in this case of a cone valve provided with elongated stems $k'$ $k^2$ on each end which are suitably guided, the one in the entrance passage of the outer member $e'$, and the other in the central passage of the inner member $e^2$, the said stems being long enough to permit of the relative screwing movements of the respective members. The threads on the right and left handed screwed parts may be reversed if required.

The inner member $e^2$ of the tubular stem is held against rotation relatively to the sleeve $b$ by a suitable keyway or guide $i$, and its inner end is enlarged so as to form a valve head $o$ provided with lateral air passage $o'$ and a rubber face suitably secured by a head in the centre, or in other suitable manner. The sleeve $b$ is adapted to screw into the air tube stem $a$ for a suitable distance so that the said valve head $o$ which is made large enough to pass within the said air tube stem, with air clearance, may be moved to and from its seating on the entrance to the air tube passage $p$. The said sleeve $b$ is provided with an operating flange $c$ adapted to engage the end of the air tube stem, where a suitable air tight washer $d$ is fitted.

In operation, the act of screwing on the inflator nozzle or a continuation of such movement screws the outer member $e'$ into the sleeve $b$ and the said member $e'$ by reason of the reversed screw threads, operates as a nut to screw back the inner part or member $e^2$ of the tubular stem with its valve head, and thus open the passage $p$ to the air tube, the air pressure in the latter being maintained during inflation by the non-return valve $k$. After inflation, the movement necessary to the removal of the inflator nozzle, or a rotation of the outer member $e'$ in the same direction, again forces the valve head $o$ on to its seat over the air tube inlet.

What we claim as our invention and desire to secure by Letters Patent is:—

A valve for pneumatic tires and like purposes comprising the combination of an outer tubular stem provided with an inlet to the air tube, a sleeve screwing into said outer tubular stem, an inner tubular stem divided into inner and outer members screwing one upon the other and the outer member screwing into the sleeve with a reverse thread, the inner member of said divided tubular stem being provided with a valve head seated on the opening to the air tube and having air passages opening laterally behind the said valve head, a valve chamber formed between the two members of said inner tubular stem, a conical non-return valve located in said valve chamber and adapted to be seated against the outer member and having stems projecting from each end so as to be guided in the air passages of both members, the outer member of said inner tubular stem being threaded to receive the nozzle of the inflator so as to be operated thereby, and also provided with a head for independent operation.

ROY G. OLD.
FREDERICK WILLIAM HILL.